(12) United States Patent
Gobessi et al.

(10) Patent No.: US 6,276,748 B1
(45) Date of Patent: *Aug. 21, 2001

(54) LIGHTWEIGHT CAB/SLEEPER FOR TRUCKS

(75) Inventors: Mark Gobessi; Wes M. Arnold, both of Kelowna (CA)

(73) Assignee: Western Sear Trucks Inc., Kelowna (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,499

(22) Filed: Mar. 17, 1998

(51) Int. Cl.[7] ........................................ B60J 7/00
(52) U.S. Cl. ..................... 296/190; 296/191; 296/181; 296/187; 296/197
(58) Field of Search ............... 296/190.02, 29, 296/166, 167, 197, 901, 183, 190.01, 191, 190.08

(56) References Cited

U.S. PATENT DOCUMENTS

| | | |
|---|---|---|
| 2,815,243 | 12/1957 | Campell . |
| 3,951,222 | 4/1976 | Fletcher . |
| 4,027,739 | 6/1977 | Allenthorp et al. . |
| 4,124,246 | 11/1978 | Brown et al. . |
| 4,496,188 | 1/1985 | Ezell et al. . |
| 4,671,560 * | 6/1987 | Pettite et al. ........................... 296/166 |
| 4,705,716 * | 11/1987 | Tang ....................................... 296/191 |
| 4,707,020 | 11/1987 | Enokida et al. . |
| 4,739,853 | 4/1988 | Ogilvie . |
| 4,775,179 * | 10/1988 | Riggs ................................. 296/190.02 |
| 4,913,485 | 4/1990 | Moffatt et al. . |
| 4,917,435 * | 4/1990 | Bonnett et al. ....................... 296/901 |
| 4,950,522 | 8/1990 | Vogt et al. . |
| 4,978,163 | 12/1990 | Savio . |
| 4,978,164 * | 12/1990 | Nakamura et al. ............. 296/203.03 |
| 5,041,318 * | 8/1991 | Hulls ..................................... 296/191 |
| 5,042,395 | 8/1991 | Wackerie et al. . |
| 5,083,834 | 1/1992 | Moffatt et al. . |
| 5,139,307 * | 8/1992 | Koops et al. ......................... 296/201 |
| 5,140,913 | 8/1992 | Takeichi et al. . |
| 5,150,944 | 9/1992 | Yoshida et al. . |
| 5,238,267 | 8/1993 | Hutchison et al. . |
| 5,282,661 | 2/1994 | Arnberger . |
| 5,286,081 | 2/1994 | Martin, Jr. . |
| 5,310,239 * | 5/1994 | Koske et al. ........................ 296/24.1 |
| 5,314,230 | 5/1994 | Hutchison et al. . |
| 5,362,120 * | 11/1994 | Cornille, Jr. ........................... 296/29 |
| 5,403,063 * | 4/1995 | Sjostedt et al. ...................... 296/191 |
| 5,449,213 | 9/1995 | Kiley et al. . |
| 5,474,352 | 12/1995 | Davies et al. . |
| 5,527,404 | 6/1996 | Warren . |
| 5,535,841 | 7/1996 | Cobes, Jr. et al. . |
| 5,538,094 | 7/1996 | Cobes, Jr. et al. . |
| 5,560,673 | 10/1996 | Angelo . |
| 5,584,527 | 12/1996 | Sitter . |
| 5,605,371 | 2/1997 | Borchelt et al. . |
| 5,664,397 * | 9/1997 | Holz ..................................... 296/191 |

(List continued on next page.)

FOREIGN PATENT DOCUMENTS

00371874 * 12/1988 (DE) ............................. 296/190.02

*Primary Examiner*—Joseph D. Pape
*Assistant Examiner*—Kiran B. Patel
(74) *Attorney, Agent, or Firm*—Christensen O'Connor Johnson Kindness PLLC

(57) ABSTRACT

A lightweight cab/sleeper for a transport truck tractor is made of composite assembly panels and extrusion framing. A lightweight sleeper may be attached to a cab designed for that purpose by adhering the perimeter of a forward opening of the lightweight sleeper to the perimeter of a corresponding rear opening of the cab to form a single unified cab sleeper assembly.

7 Claims, 15 Drawing Sheets

U.S. PATENT DOCUMENTS

| | | | | |
|---|---|---|---|---|
| 5,733,631 | * | 3/1998 | Kelman | 296/191 |
| 5,735,568 | * | 4/1998 | Arnold | 296/190.02 |
| 5,769,486 | * | 6/1998 | Novoa et al. | 296/190 |
| 5,772,276 | * | 6/1998 | Fetz et al. | 296/191 |
| 5,849,122 | * | 12/1998 | Kenmochi et al. | 296/191 |
| 5,860,693 | * | 1/1999 | Ehrlich | 296/191 |
| 5,863,091 | * | 1/1999 | Shepherd et al. | 296/191 |
| 5,915,781 | * | 6/1999 | DeRees | 296/29 |
| 5,938,274 | * | 8/1999 | Ehrlich | 296/191 |
| 5,997,076 | * | 12/1999 | Ehrlich | 296/191 |

* cited by examiner

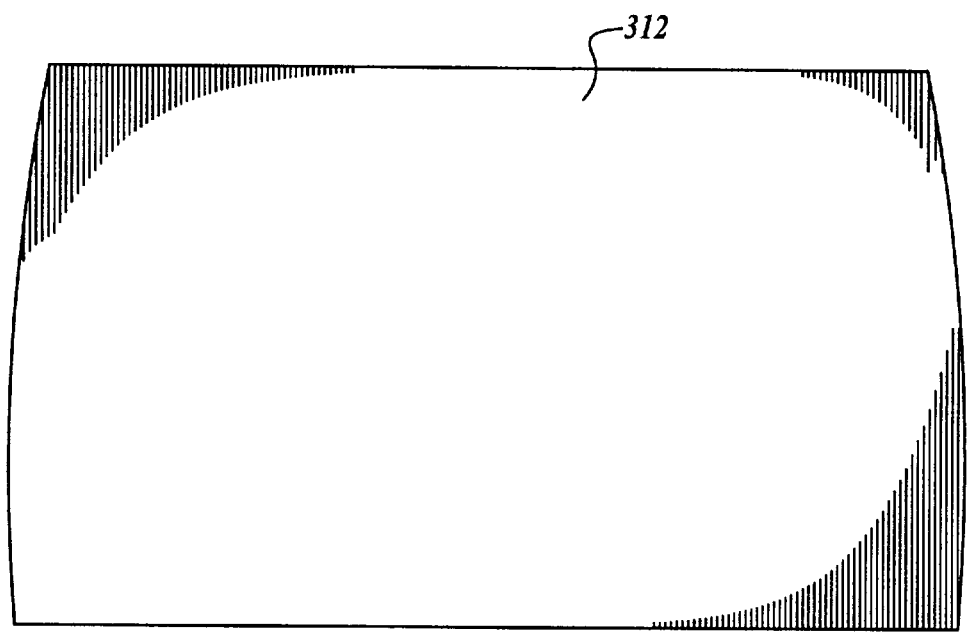
*Fig.16*
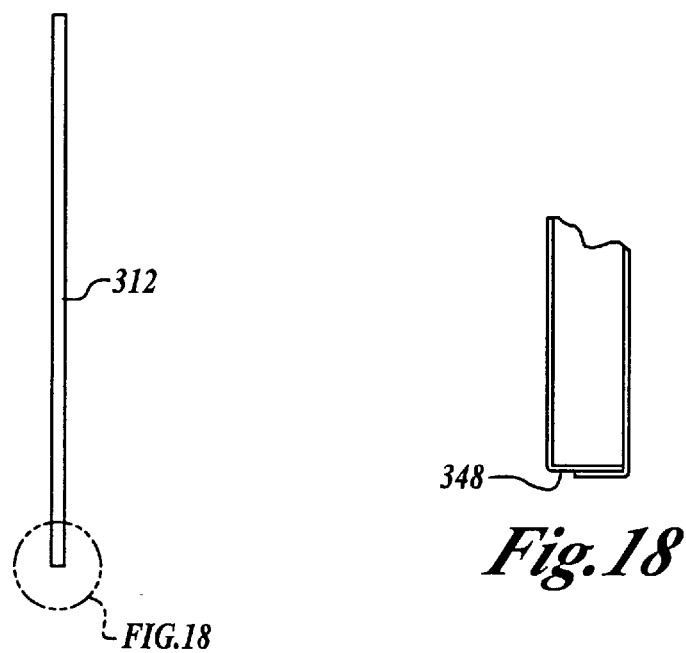
*Fig.17*
*Fig.18*

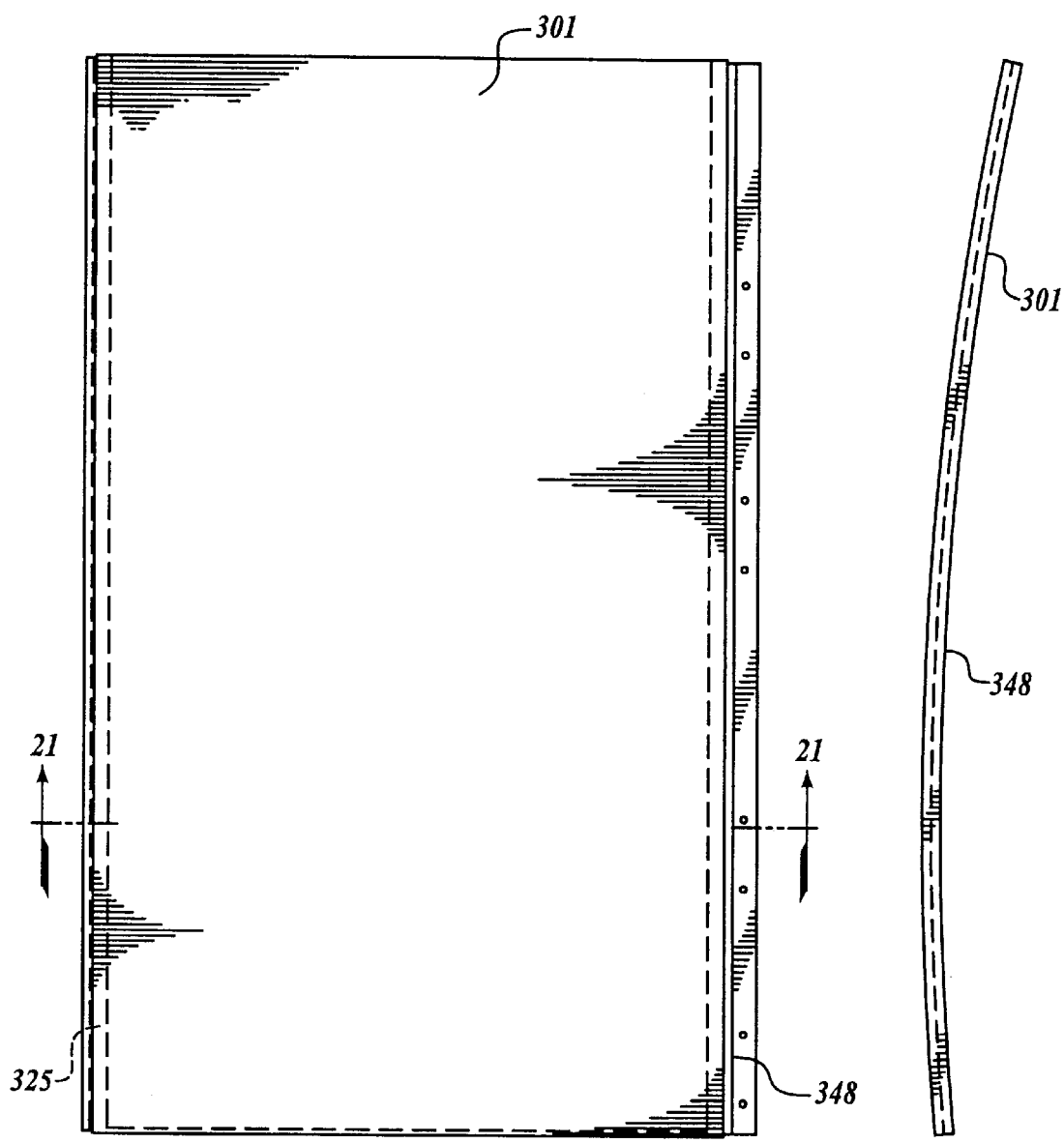
*Fig.19* *Fig.20*
*Fig.21*

LIGHTWEIGHT CAB/SLEEPER FOR TRUCKS

BACKGROUND OF THE INVENTION

1. Field of the Invention

This invention relates to cabs and sleepers for trucks.

2. Description of the Related Art

Road transport trucks intended to carry loads long distances often are provided with sleepers mounted behind the cabs of the trucks. The driver operates the truck while sitting in the cab. The driver may park the truck at a truck stop or rest station, and then rest inside the sleeper behind the cab. Alternatively, one driver can sleep in the sleeper while another driver drives the truck. For this reason, the sleeper is generally accessible from the cab.

The sleeper typically has the shape of a generally rectangular parallelepiped and contains a compartment which is usually provided with a bed so that the driver may enjoy comfortable sleep. The sleeper may also contain a closet, a desk, shelving and other furniture, storage containers, and appliances useful in long distance travel. The cab and the sleeper of a transport truck are usually mounted above the frame of the truck on suspension apparatus in order to permit a more comfortable ride for the driver(s). The sleeper may be an extension of the cab or may be a separate unit mounted behind the cab.

Transport trucks are usually supplied according to the specifications of the owner. Thus, the owner may specify whether or not the truck will have a sleeper, the size and furnishings of the sleeper if one is required, in addition to a myriad of other specifications for the truck. An example of a line of trucks which may be custom built to the specifications of the owner is the Western Star Constellation series of trucks. A company manufacturing such trucks, however, must be able to provide cabs and sleepers of different sizes and heights. Such companies, therefore, must be able to readily manufacture cabs and sleepers of different specifications according to the demands of the market. A reduction in the expense and difficulty of manufacturing cabs and sleepers is desirable.

Cabs and sleepers add to the weight of a truck. Reducing the weight added by the cab and sleeper is desirable because a transport truck faces overall weight restrictions imposed by highway regulations. The weight saved in the cab and/or sleeper can be added to the payload.

Hitherto, cabs and sleepers usually have been made of sheet steel in a manner well known to the automotive art. U.S. Pat. No. 5,560,673 to Angelo and U.S. Pat. No. 5,310,239 to Koske et al. disclose cabs and sleepers of this type of manufacture.

Sheet steel is heavy. In addition, large flat or curved surfaces of sheet steel must be reinforced by internal ribbing and struts adhered or tack welded to the external sheet in order to preserve the shape and rigidity of the sheet. The additional struts or bracing add further to the weight of cabs and sleepers made this way. In addition, the contacts between the struts and the external sheet of steel create stress points which affect the smoothness of the external surface of such a sheet, which detracts from the external appearance. Sleepers especially have large flat or curved surfaces and manufacturers have found it difficult to make these surfaces smooth and free of stress points because of the inherent limitations of the sheet steel technology. Sheet steel construction also results in problems with vibration. Insulation is generally provided to dampen vibration and protect against external temperature extremes.

U.S. Pat. No. 5,083,834 to Moffat et al. disclosed a sleeper made as a one-piece box-type shell composed of fiberglass reinforced plastic materials. Such a construction is claimed to be lighter, better insulated, less costly and better looking. A one piece construction of this type, however, is not readily altered or repaired.

Accordingly, a need exists for lightweight cabs and sleepers for transport trucks. The sleepers especially should be readily manufactured in a number of different sizes and models in order to accommodate the demands of the market. The sleepers should be readily attachable to a cab and provide easy access between the cab and the sleeper. Such sleepers should be strong and provide vibration and temperature insulation. Preferably, the external surfaces of such sleepers should be smooth for an attractive appearance.

SUMMARY OF THE PREFERRED EMBODIMENTS

It is the object of the present invention to overcome the disadvantages of current cabs and sleepers and especially to provide cabs and sleepers meeting the above and other needs.

The invention provides a cab and sleeper assembly which uses composite assembly panels and framing as structural components. In a particular aspect of the invention, a sleeper is provided that is largely made from composite assembly panels and framing. Such a sleeper is very lightweight. It is easily manufactured by adhering the panels and framing together. Sleepers of different sizes and shapes may be readily made by using different standard panels and framing.

Such a lightweight sleeper may be designed to attach to a correspondingly designed cab that may also incorporate composite assembly panels. The rear of the cab preferably is an opening and the front of the sleeper preferably contains a corresponding opening. The cab and the sleeper then are joined at the peripheries of these respective openings. In a preferred embodiment, the cab and the sleeper are attached to each other by the use of thick-bonded adhesive. Reinforcing bolts and plates may be provided at high stress points if necessary. Such a method of joining the cab to the sleeper is quickly and easily accomplished. In addition, the cab may be readily separated from the sleeper by removing whatever strengthening bolts have been provided and severing the adhesive at the interface of the cab and the sleeper.

A rear panel may be attached to the opening in the rear of the cab when the owner desires to operate the truck without a sleeper. In addition, cabs can be manufactured to a standard design having rear openings either for attachment to a sleeper or for enclosure with a panel in the event that the cab is to be supplied without a sleeper ("day cab"). Preferably, the panel closing the rear opening of a cab is made of a composite assembly. The cab may also be provided with a composite assembly floor panel.

BRIEF DESCRIPTION OF THE DRAWINGS

FIG. 16 is a side view of the back panel of the sleeper shown in FIG. 4.

FIG. 17 shows the right edge of the back panel shown in FIG. 16.

FIG. 18 is an enlargement of a portion of the back panel shown in FIG. 17.

FIG. 19 is a side view of a lefthand body side panel of the sleeper shown in FIG. 5.

FIG. 20 is a view of the right edge of the lefthand body side panel shown in FIG. 19.

FIG. 21 is a cross-sectional view taken along the line 21—21 in FIG. 19.

DETAILED DESCRIPTION OF THE PREFERRED EMBODIMENTS

Figure 1:
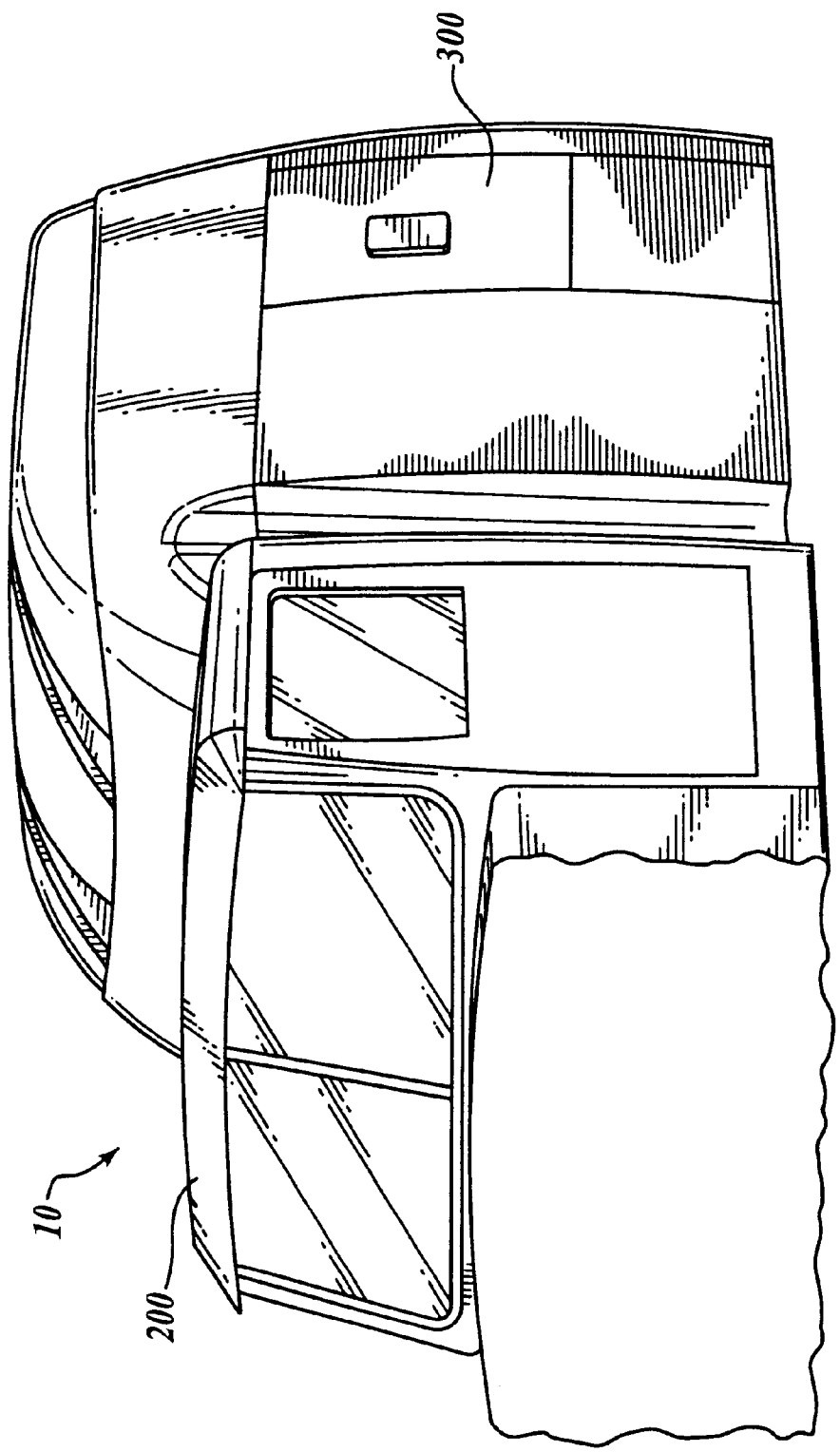
FIG. 1 is a perspective of a preferred embodiment of a combination of a lightweight sleeper and a cab according to the invention.

FIG. 1 shows a preferred embodiment of a lightweight sleeper 300 attached to a cab 200. The combination of the cab and the sleeper is generally referred to by reference numeral 10.

Figure 2:
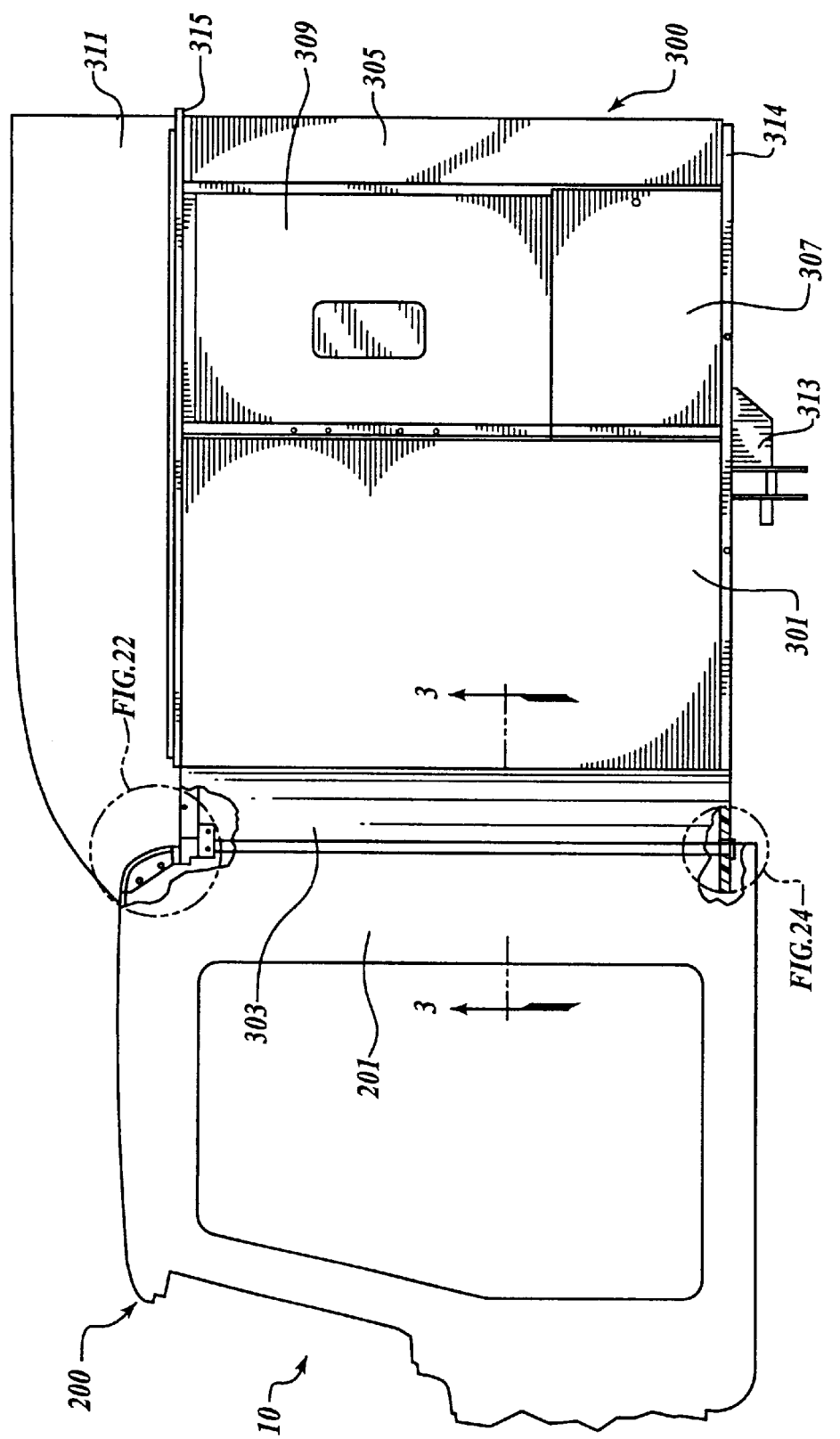
FIG. 2 is a side elevation of the cab and sleeper shown in FIG. 1.

FIG. 2 shows another view of the cab/sleeper combination 10. Only a portion of the cab 200 is shown in FIG. 2. The entire lightweight sleeper 300 is seen in FIG. 2. The lightweight sleeper 300 is attached to the rear of the cab 200. The lightweight sleeper 300 shown in FIG. 2 is a relatively large 76-inch sleeper (the dimension from front to rear of the sleeper). A lightweight sleeper according to the present invention could be made in virtually any length and accordingly the length of the sleeper shown in FIG. 2 is not to be viewed as limiting.

Figure 4:
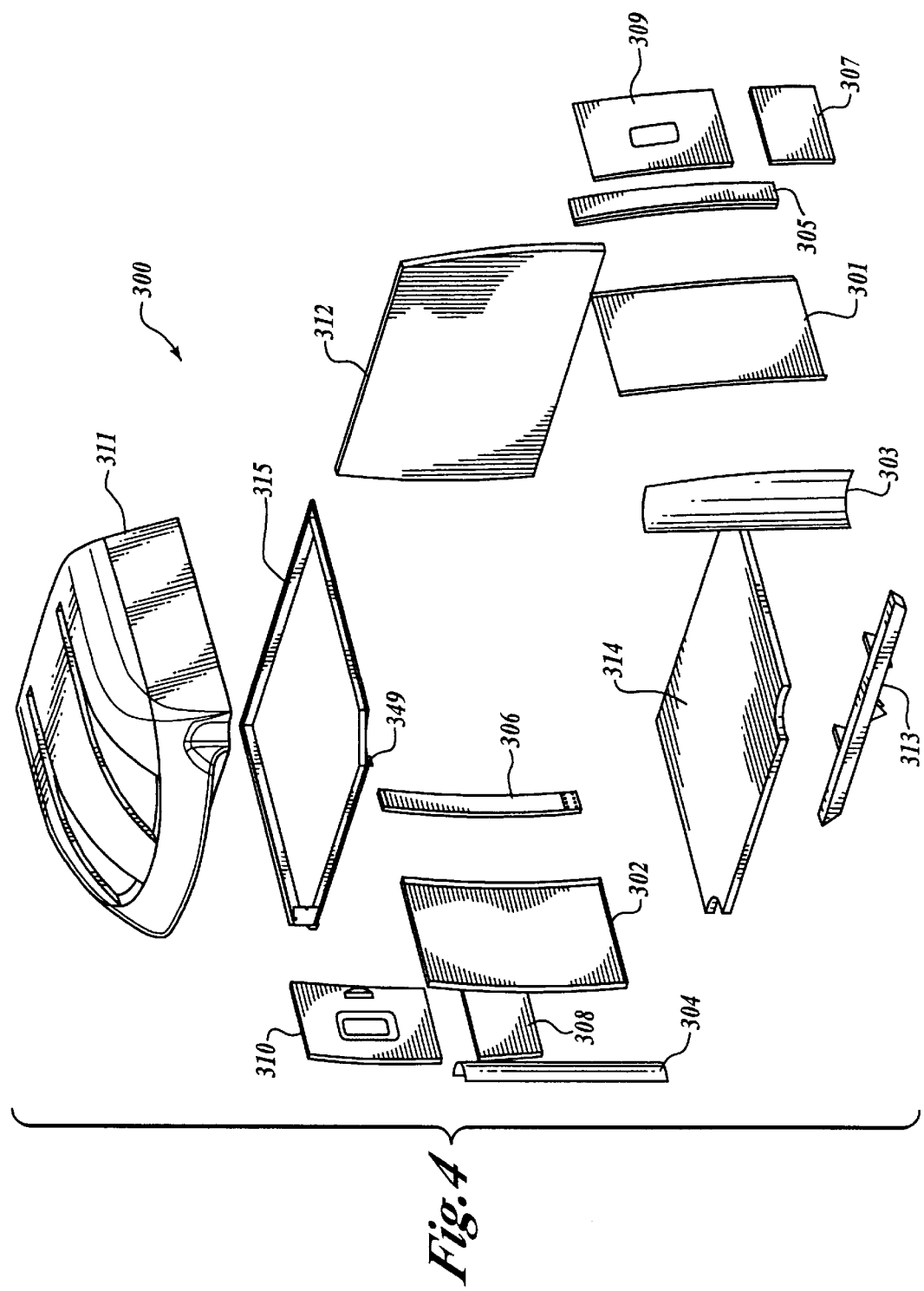
FIG. 4 is an exploded view of the lightweight cab/sleeper shown in FIG. 1.

The major components of the preferred embodiment of the lightweight sleeper shown in FIGS. 1 and 2 may be seen in the exploded view of FIG. 4. A floor assembly 314 is at the bottom of the lightweight sleeper and in turn rests on the support beam assembly 313. The support beam assembly 313 serves as the attachment point to the suspension that supports the lightweight sleeper 300 on the frame of the truck (not shown). The support beam assembly 313 is both adhered and bolted to the floor assembly 314.

The roof cap 311 is the top of the lightweight sleeper 300. The roof cap 311 preferably is molded from resin-impregnated fiberglass. The roof cap may also be made of a composite assembly such as that used in making the body side panels 301 and 302, described below. The roof cap 311 is adhered to the drip rail assembly 315 with adhesive. The drip rail 315, a welded frame preferably made of aluminum alloy extrusions, and the floor assembly 314 are attached to the side components of the lightweight sleeper 300, namely, the left-hand and right-hand body side panels 301 and 302, respectively, the left-hand and right-hand front quarter panels 303 and 304, respectively, the back panel 312, and the left-hand and right-hand rear corner posts 305 and 306, respectively. The body side panels 301 and 302, the floor assembly 314 and the back panel 312 are lightweight composite assemblies.

The sleeper 300 is assembled by fixturing the floor assembly 314 and the drip rail assembly 315 into position and then installing the remainder of the components in the manner described below in connection with FIGS. 9–14.

The left-hand and right-hand luggage doors 307 and 308 are located between the left-hand body side panel 301 and the left-hand rear corner post 305 and between the right-hand body side panel 302 and the right-hand rear corner post 306, respectively. Each of the luggage doors 307 and 308 is hinged to the left-hand and right-hand body side panels 301 and 303 respectively, and contains a lock for engaging the left-hand and right-hand rear corner posts 305 and 306, respectively. The left-hand and right-hand driver doors 309 and 310 are located above the luggage door assemblies 307 and 308, respectively, and are hinged and locked in a manner similar to that of the luggage doors 307 and 308.

The luggage doors 307 and 308 and the driver doors 309 and 310 are optional. A lightweight sleeper according to the present invention may be made without these doors or with even more doors. Omission of these doors may be desirable if the front and aft length of the sleeper is to be shorter than that of the preferred embodiment shown in the drawings.

Furthermore, one or both of the driver doors 309 and 310 could be replaced with a fixed or movable window. The location, size and number of side doors and windows is a matter of choice. Virtually any configuration of windows and doors can be accommodated by changing the size and/or location of structural components such as the body side panels 301 and 302 or the rear corner posts 306 and 307.

Figure 5:
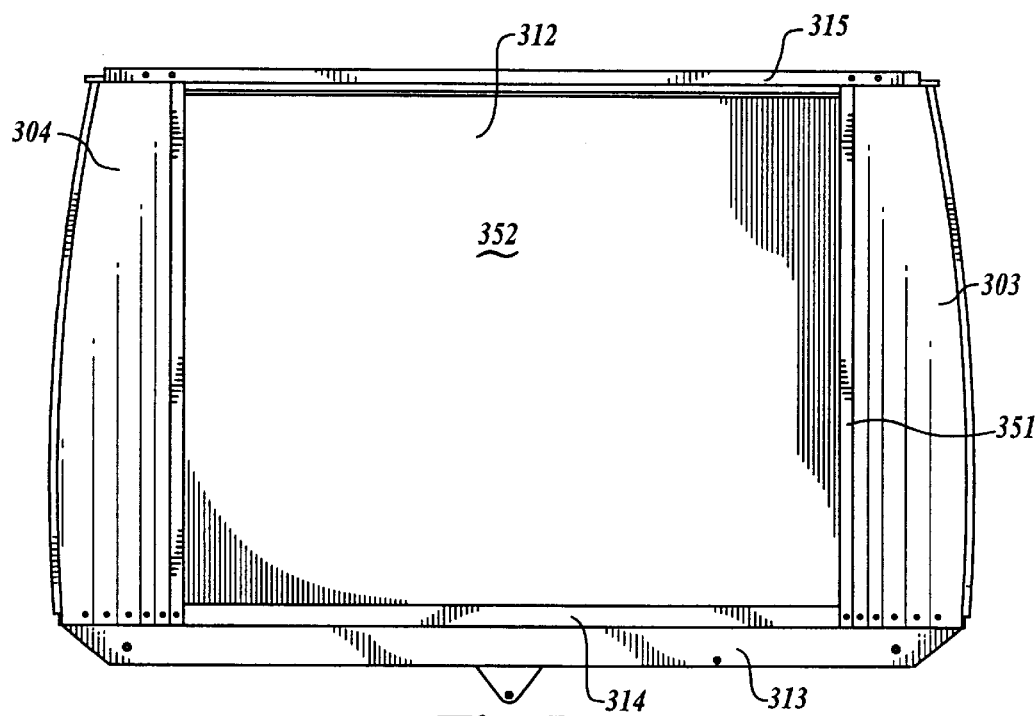
FIG. 5 is a front elevation of the sleeper of FIG. 1.
Figure 6:
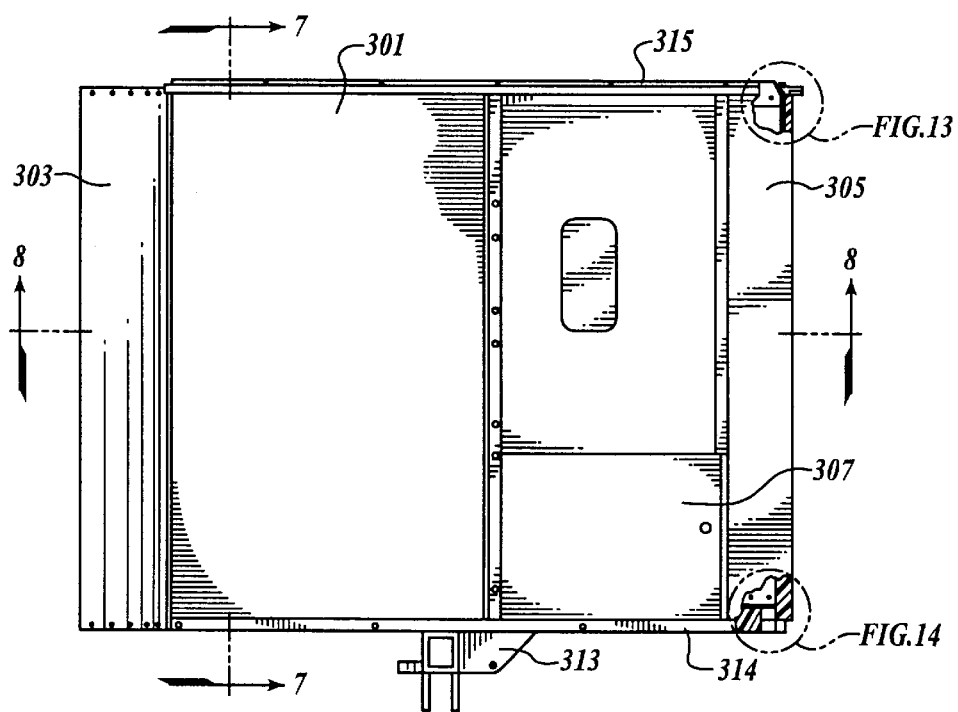
FIG. 6 is a side elevation of the sleeper of FIG. 1, omitting the roof cap.

FIG. 5 shows the front of the lightweight sleeper 300. The sleeper has a rectangular front opening 352 bounded on all four sides by a perimeter 351. The sleeper 300 connects with the rear of the cab 200, which has a corresponding rectangular rear opening 219 (see FIG. 27) bounded by a perimeter 220.

Figure 3:
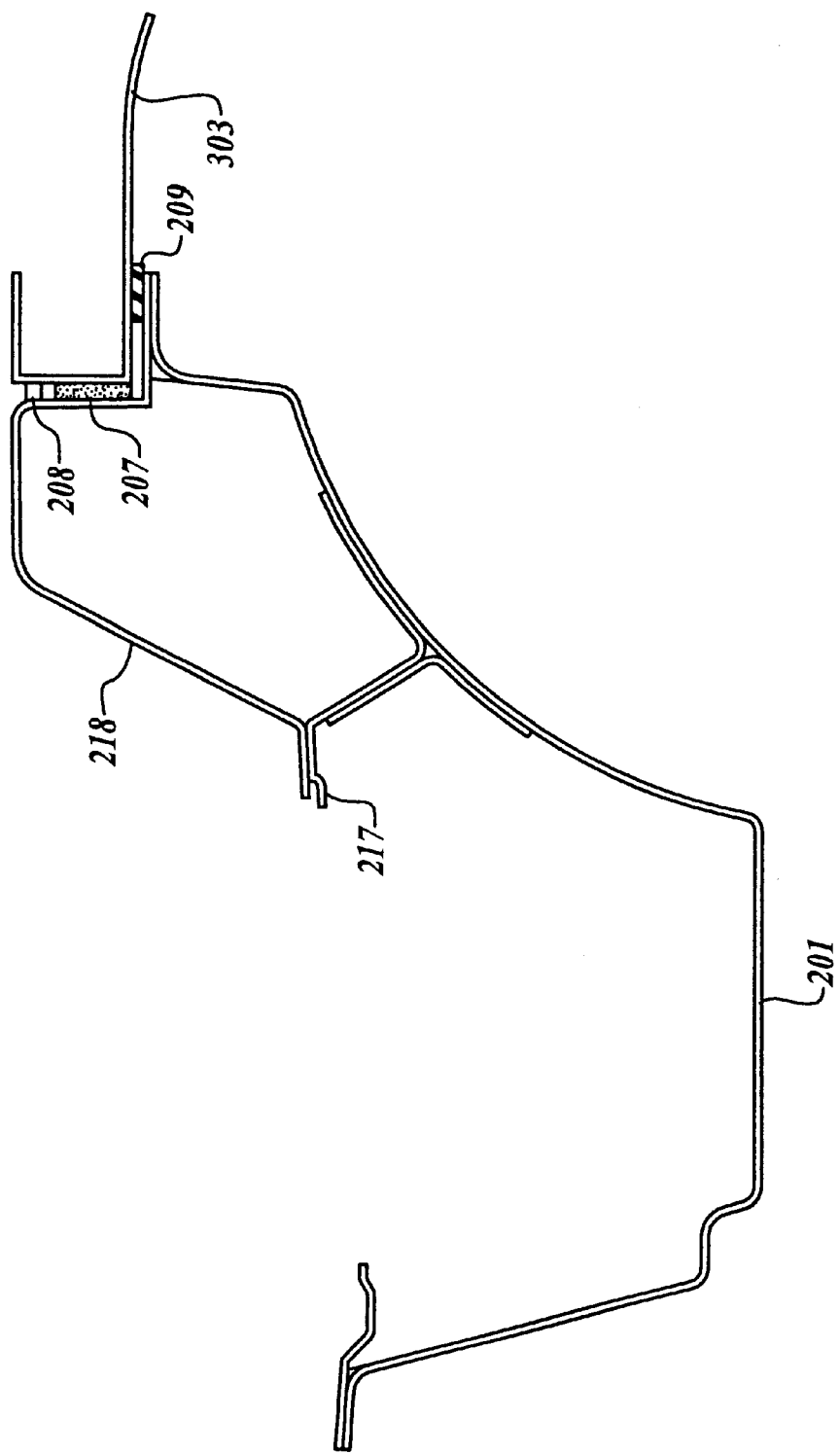
FIG. 3 is a cross-section taken along the lines 3—3 in FIG. 2.
Figure 22:
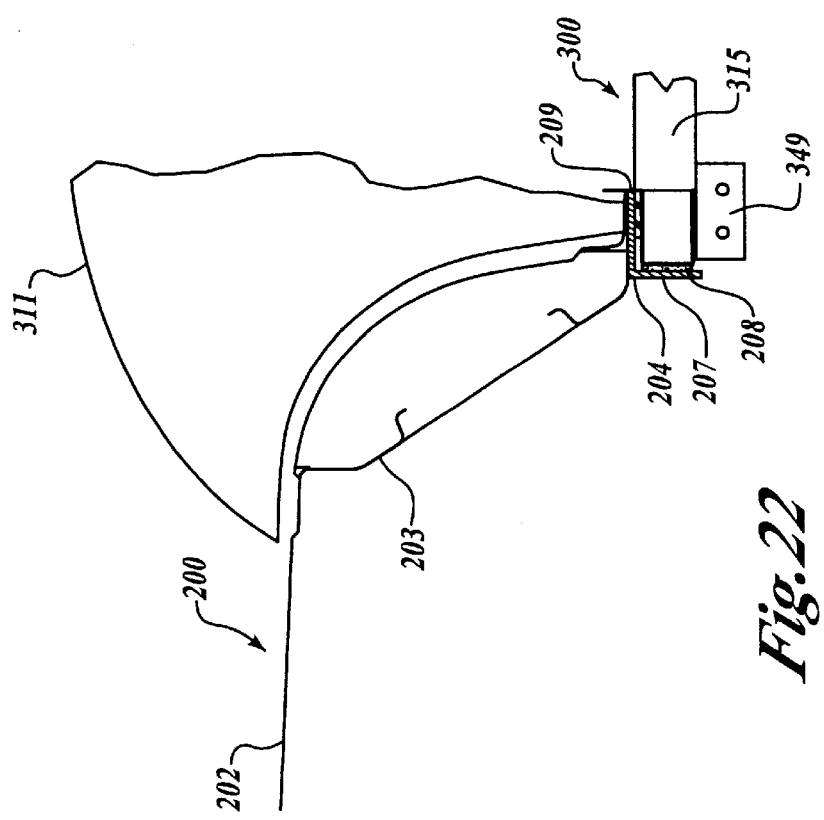
FIG. 22 is a partial expanded cross-section of the cab/sleeper combination shown in FIG. 2.
Figure 24:
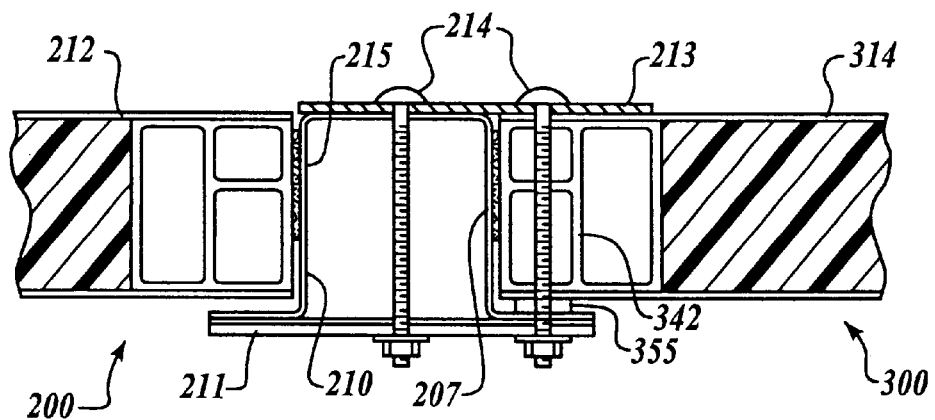
FIG. 24 is a partial expanded cross-section of the cab/sleeper combination shown in FIG. 2.

An adhesive is applied between the perimeters 351 of the sleeper 300 and the perimeter 220 of the cab 200 in order to join the cab 200 to the sleeper 300. The discussion below in connection with FIGS. 3, 22, and 24 provides more detail concerning how the cab 200 and the sleeper 300 are joined at their interface.

Figure 7:
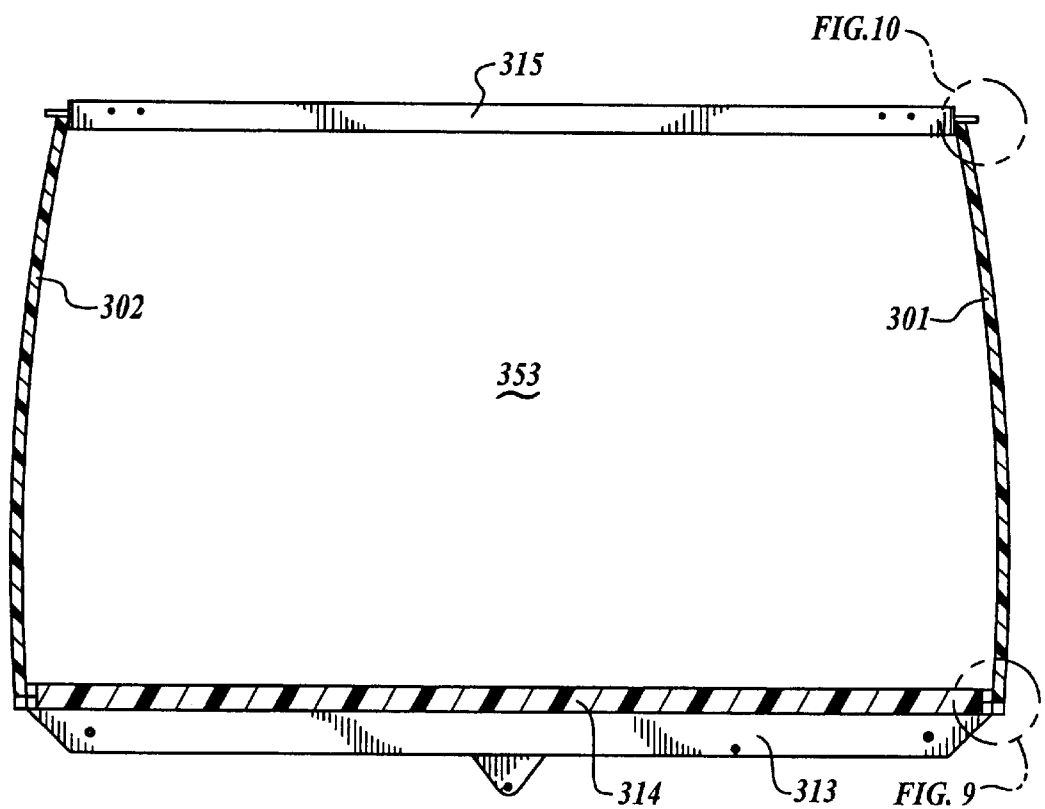
FIG. 7 is a cross-section of the sleeper taken along the line 7—7 in FIG. 6.

The cross-section of the sleeper 300 shown in FIG. 7 (the roof cap 311 is omitted) shows how the body side panels 301 and 302 are attached at their tops and bottoms to the drip rail assembly 315 and the floor assembly 314, respectively. The compartment 353 defined by the panels, framing and roof of the sleeper 300 may contain a bed and other furniture and appliances (not shown) as is usual in a sleeper.

Figure 8:
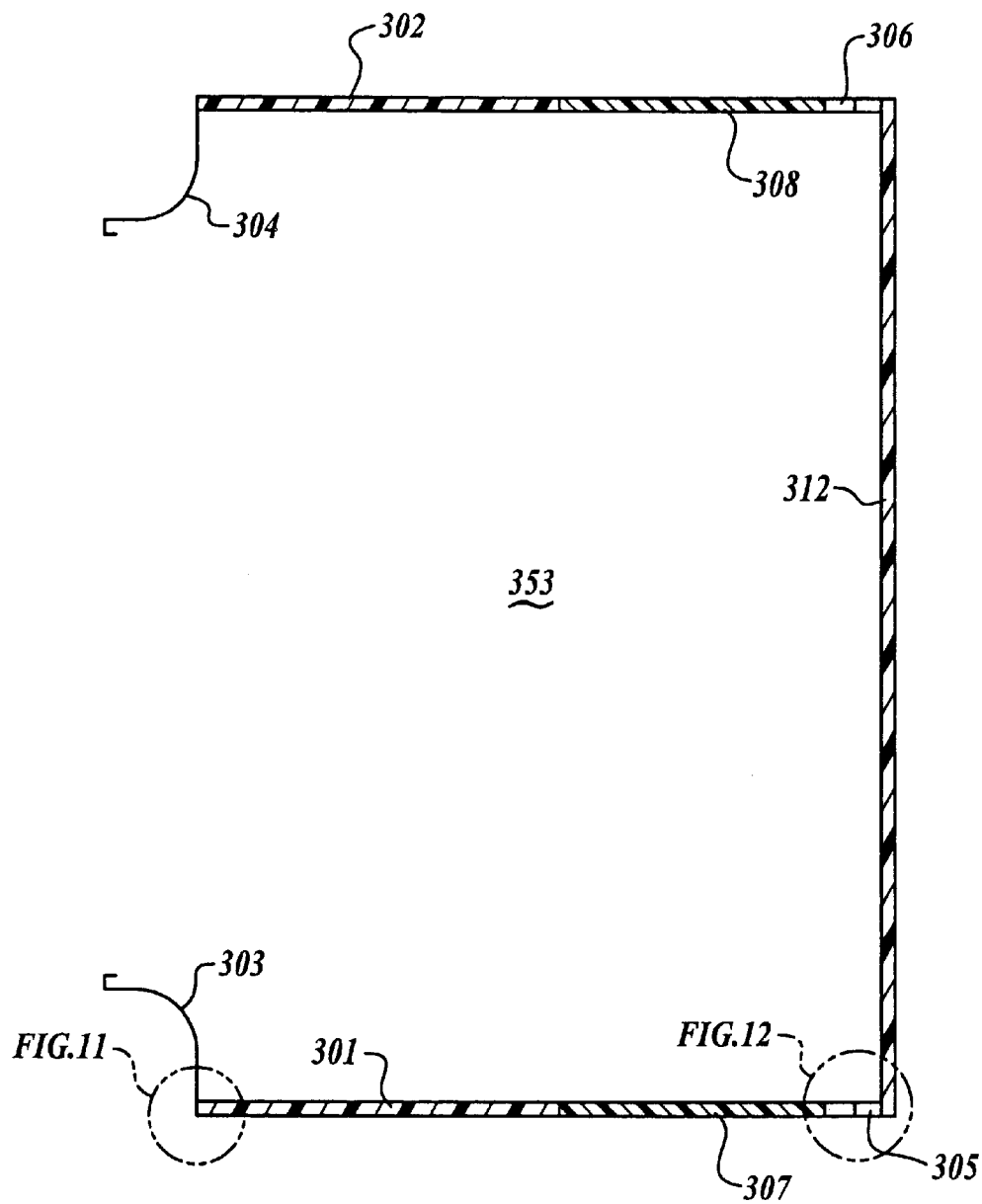
FIG. 8 is a cross-section of the sleeper taken along the line 8—8 in FIG. 6.

The cross-sections of the sleeper 300 in FIGS. 7 and 8 show how the body side panels 301 and 302, the front quarter panels 303 and 304, the rear corner posts 305 and 306, and the back panel 312 are connected. The locations of the driver doors 305 and 306 are also shown in this figure.

FIGS. 9 through 14 are cross-sections showing in more detail how the components of the sleeper 300 are connected.

Figure 9:
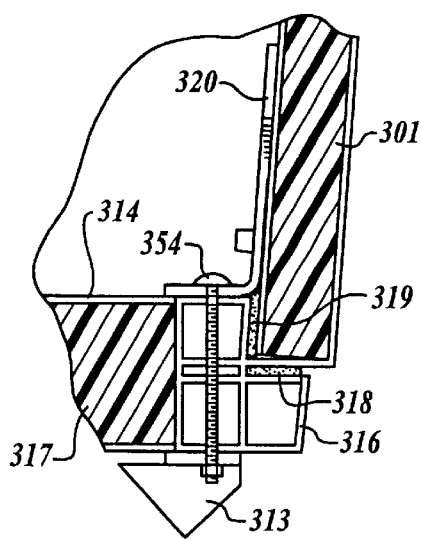
FIG. 9 is an expanded view of a portion of the cross-section of the sleeper shown in FIG. 7.

FIG. 9 shows how the left-hand body side panel 301 is connected to the floor assembly 314. The left-hand body side panel 301 is adhered to the left-hand outer floor assembly extrusion 316 (see discussion of the assembly of floor assembly 314 in connection with the discussion below concerning FIG. 15) along bondlines 318 and 319. A preferred adhesive for joining all of the frames and panels of the sleeper 300 is Sikaflex 254 polyurethane adhesive. A bracket 320 provides additional strength to the interface of the left-hand body side panel 301 and the floor assembly 314. The bracket 320 is riveted to the left-hand body side panel 301 and attached by bolts 354 to the floor assembly 314 and, as shown in FIG. 9, to the support beam assembly 313. The attachment of the right-hand body side panel 302 to the floor assembly 314 is the same.

Figure 10:
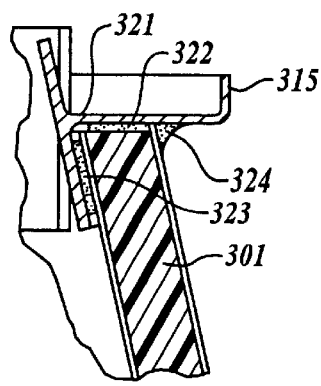
FIG. 10 is an expanded view of another portion of the cross-section of the sleeper shown in FIG. 7.

FIG. 10 shows the attachment of the left-hand body side panel 301 to the drip rail assembly 315. The left-hand body side panel 301 is adhered to the left-hand drip rail outer extrusion 321 along bond lines 322 and 323. Rivets (not shown) may also be used to connect the left hand body side panel 301 to the drip rail assembly 315, although the use of an adhesive is preferred, in which case rivets may be employed as reinforcement at high stress points in the junction of the left hand body side panel 301 to the drip rail assembly 315 (and, for that matter, at other framing/panel junctions such as those shown in FIGS. 11–14). A sealant 324 is applied to the external junction of the left-hand drip rail outer extrusion 321 and the left-hand body side panel 301. The sealant 324, as with the other sealants described below, is preferably made of a polyurethane and is capable both of preventing the ingress of moisture and of a taking a Class A finish in order to be consistent with the Class A finish that preferably will be applied to the exterior of the sleeper 300. The attachment of the right-hand body side panel 302 to the drip rail assembly 315 is the same as that for the left-hand body side panel 301.

Figure 11:
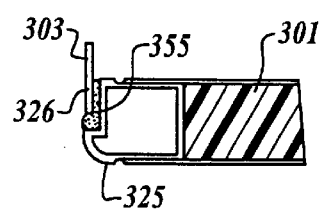
FIG. 11 is an expanded view of a portion of the cross-section of the sleeper shown in FIG. 8.

FIG. 11 shows how the left-hand body side panel is connected to the left-hand front quarter panel 303. The front quarter panels are preferably made of an aluminum alloy such as 5052 H32 aluminum alloy. The left-hand body side panel 301 has a front post 325 which is an extrusion preferably made of aluminum alloy such as 6063 T5 aluminum alloy. The left-hand body side front post 325 is adhered to the left-hand front quarter panel 303 along bond line 326. The attachment of the right-hand front quarter panel 304 to the right-hand body side panel 302 is the same.

Figure 12:
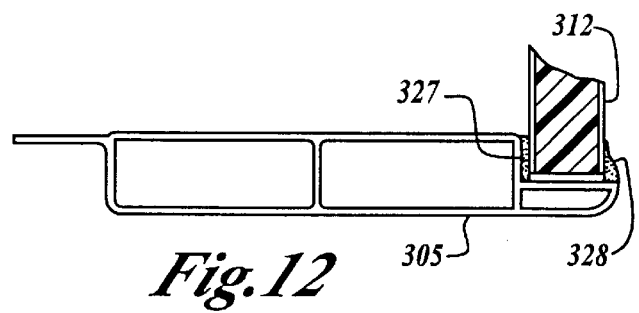
FIG. 12 is an expanded view of another portion of the cross-section of the sleeper shown in FIG. 8.

FIG. 12 shows how the left-hand rear corner post 305 is attached to the rear panel 312. The left-hand rear corner post 305 is an extrusion, preferably made of aluminum alloy such as 6063 T5 aluminum alloy, which contains an indentation into which the rear panel 312 fits. The rear panel 312 is adhered to the left-hand rear corner post 305 along bond line 327. A line of sealant 328 is applied to the external juncture between the back panel 312 and the left-hand rear corner post 305. The attachment of the right-hand rear corner post 306 to the back panel 312 is the same.

Figure 13:
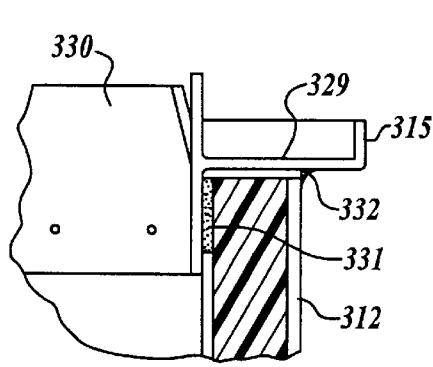
FIG. 13 is an enlarged partial cross-section of a portion of the sleeper shown in FIG. 6.

FIG. 13 shows how the back panel 312 is connected to the drip rail 315 by an adhesive in a bond line 331 between the back panel 312 and the rear drip rail extrusion 329. A sealant 332 is applied to the external junction between the back panel 312 and the rear drip rail extrusion 329.

Figure 14:
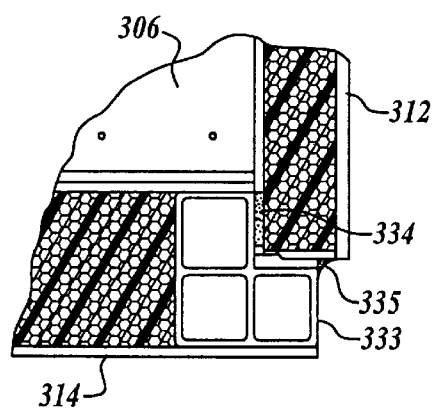
FIG. 14 is an enlarged partial cross-section of another portion of the sleeper shown in FIG. 6.

FIG. 14 shows how the back panel 312 is attached to the floor assembly 314. The back panel 312 is adhered to the rear extrusion of 333 of the floor assembly 314 by adhesive at the bond line 334. The sealant 335 is applied at the external junction between the back panel 312 and the rear extrusion 333 of the floor assembly 314.

The body side panels 301 and 302, the back panel 312, and the floor assembly 314 are composite assemblies. In this specification, a "composite assembly" is a sandwich of two skins separated and spaced by a core. A composite assembly may include extrusions or other framing members attached to or in between the skins. The skins are preferably sheets of lightweight material having good tensional strength, such as aluminum sheeting or resin-impregnated fiberglass sheets. The cores are preferably made of lightweight material having good compressional strength, such as balsa or a honeycomb made of aluminum or polypropylene in which the hexagonal cells are aligned perpendicular to the skins The sandwich construction of the composite assemblies made of such materials provides lightweight strength and rigidity.

Figure 15:
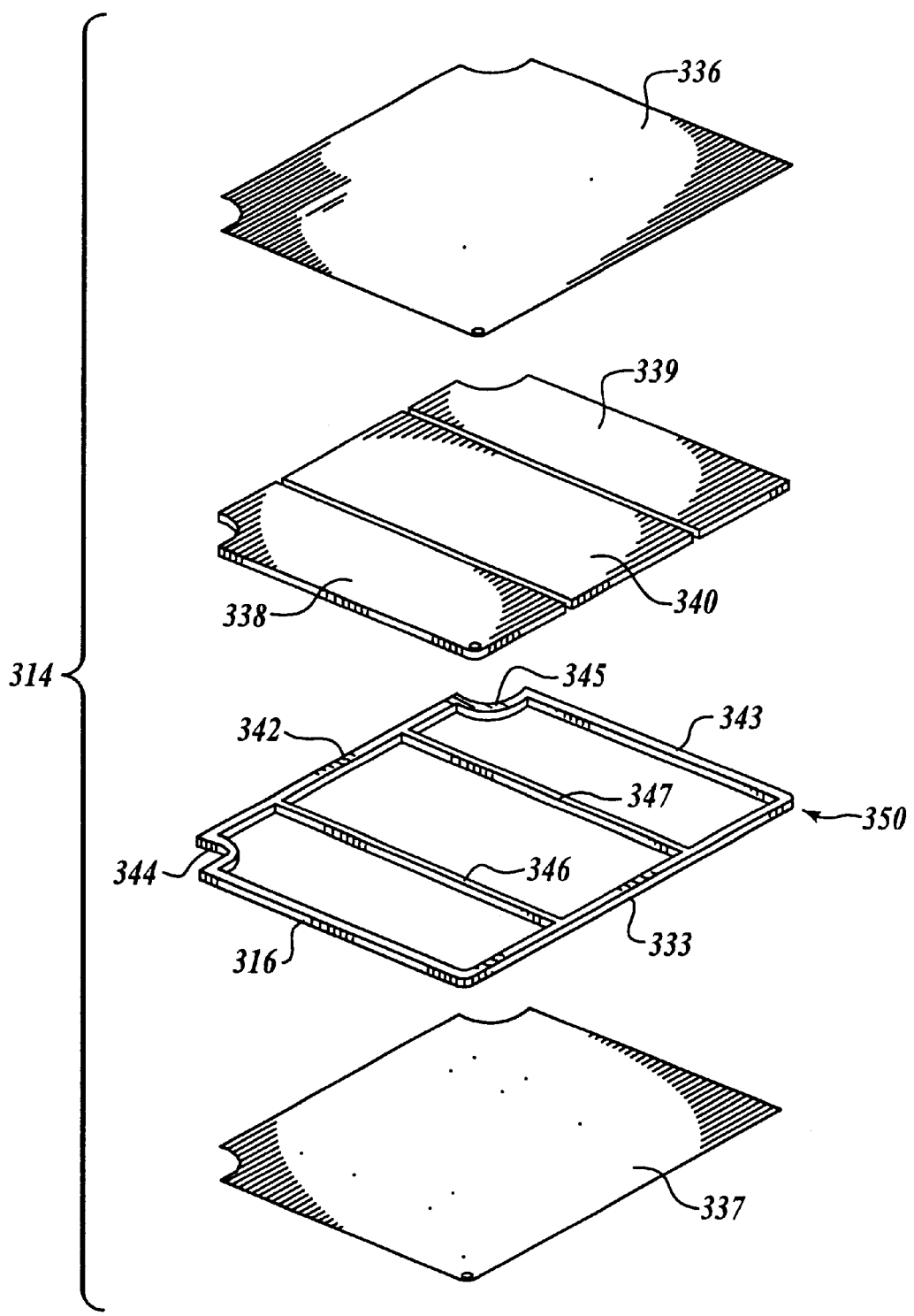
FIG. 15 is an exploded view of the floor assembly of the sleeper shown in FIG. 4.

FIG. 15 shows how the floor assembly 314 is assembled. A honeycomb core is adhered to skins, to form a strong and very lightweight structure. Metal extrusions, preferably made of aluminum alloy such as 6063 T5 aluminum alloy, are included in the metal skin-honeycomb sandwich at the edges thereof and internally for additional strength.

The floor assembly panel shown in the exploded view in FIG. 15 has an upper skin 336 and a lower skin 337 which sandwich the right-hand side core 338, the left-hand side core 339 and the central core 340. The skins preferably are thin (e.g., 0.020 to 0.030 inches thick) sheets made of an aluminum alloy such as 5052 aluminum alloy. The cores preferably are made of polypropylene honeycomb, such as the H8PP honeycomb obtainable from the Nida-Core Corporation of Palm City, Fla. which is very light (approximately 0.40 pounds per square foot of one inch thickness), resists corrosion, has high compressive strength, and insulates against vibration, noise, and external temperature extremes. The thickness of the honeycomb core is selected as needed for rigidity and strength. For example, two inches has been found to be a satisfactory thickness of the cores 338, 339, and 340 when made of H8PP honeycomb and one inch has been found to be a satisfactory thickness of the cores of the body side panels 301 and 302 and the back panel 312 when made of H8PP honeycomb.

The purpose of the extrusions at the edge of the floor assembly 314 is to provide places to adhere or attach other components of the lightweight sleeper 300. The external extrusion framing is made of a rear extrusion 341, a front extrusion 342, right-hand and left-hand side extrusions 316 and 343, respectively, and corner extrusions 344 and 345. These extrusions are welded together to make a lightweight frame 350. In addition, the left-hand and right-hand center extrusions 346 and 347 are welded to the external extrusions as shown in FIG. 15. The purpose of the center extrusions 346 and 347 is to further strengthen the floor assembly and to provide hard points for attaching bolts to the support beam assembly 313.

The floor assembly panel 314 is assembled by inserting the cores 338, 339 and 340 into the corresponding spaces in the floor assembly frame 350 and then adhering the upper and lower skins 336 and 337, respectively, to the cores 338, 339, and 340 and to the frame 350 by an appropriate adhesive. Fuller EY-4000 epoxy adhesive is currently preferred for this purpose. The floor assembly is bonded using a vacuum or press in order to exert a force to consolidate the panel while the adhesive cures.

The process of making composite assembly panels as described above in connection with the floor assembly 314 is relatively inexpensive and can easily accommodate changes in sizes and shapes of the panel assemblies. Such composite assembly panels are strong, rigid, lightweight, and provide good insulation against vibration and external temperature extremes.

The basic components of the composite assembly panels currently preferred for this invention are aluminum alloy skin, polypropylene honeycomb core, and aluminum alloy extrusions, which are easily obtained in desired shapes and sizes. No special rolling or other sheet metal working equipment or tooling is needed for making ruled contour panels. Furthermore, these components are attached by adhesive, which eliminates the need for welding and other expensive and slow procedures. Finally, the panels and frames can be manufactured at one location, transported and then assembled into a sleeper (or cab) at a different location. This modularity offers great convenience and flexibility.

FIGS. 16 through 18 are views of the back panel 312. This panel does not contain any extrusion framing. It is a sandwich preferably assembled by adhering aluminum alloy skin to polypropylene honeycomb, as described above in connection with the assembly of the floor assembly 314. The aluminum alloy skins are overlapped on the bottom (the overlap 348 is shown in shown in FIG. 18) and at the top. The polypropylene honeycomb is exposed at the side edges.

The left-hand body side panel 301 shown in FIGS. 19 through 21 contains front and rear posts 325 and 348 at its side edges. The front and rear posts 325 and 348 are aluminum alloy extrusions. The right hand body side panel 302 is constructed the same way as the left hand body panel 301. The body side panels 301 and 302 preferably are assembled by adhering aluminum alloy skin to polypropylene honeycomb and aluminum alloy extrusions, as described above in connection with the assembly of the floor assembly 314. The aluminum alloy skins are overlapped at the top and bottom edges of the body side panels 301 and 302, as described above in connection with the assembly of the back panel 312.

The cab 200 and the lightweight sleeper 300 are designed to smoothly mate at the perimeters 220 and 351 of the cab and sleeper openings 219 and 352, respectively. Spacers 208 are attached to one or the other of the perimeters 220 and 351 of the cab 200 and the lightweight sleeper 300 to prevent the perimeters from actually contacting each other (see FIGS. 3 and 22). The spacers 208 are preferably made of polyurethane and have an adhesive backing, such as the "BUM-PON" product available from 3M in 10 mm×10 mm squares that are 3 mm thick. A liquid adhesive (Sikaflex 254 polyurethane adhesive is currently preferred) is applied to the perimeter 219 of the opening in the cab 200, preferably to the entirety of the perimeter 219 which will be contacted by the perimeter 352 of the forward opening of the lightweight sleeper 300. The cab 200 and the lightweight sleeper 300 are then contacted so that the perimeter 220 of the rear opening 219 in the cab 200 and the forward opening 352 in the lightweight sleeper 300 are in close proximity and prevented from contact only by the rubber spacers 208. The adhesive attached to the perimeter 220 of the cab 200 will now contact the perimeter 351 of the lightweight sleeper 300 and form a bond line 207 which is allowed to cure and harden (see FIGS. 3, 22, and 24). The sleeper 300 and the cab 200 then will be secured together as one structural unit. A sealant 208 (see FIG. 3) may be provided at portions of the external junction of the cab 200 and the sleeper 300 for weather resistance and to conceal that junction.

Preferably, the bond line 207 between the cab 200 and the sleeper 300 should be thick enough ("thick-bonded") to permit the insertion of a knife blade into that bondline, so that it may be easily severed if desired. The bondlines described above in connection with FIGS. 9–14 preferably should also be thick bonds so that component panels of the sleeper 300 may be easily removed.

Bolts and bolt plates or mounts may be used to connect the cab 200 and the sleeper 300 at their interface at locations of high stress where additional strength is needed beyond that of the adhesive joining the perimeter 220 of the cab 200 and the perimeter 351 of the lightweight sleeper 300.

FIG. 22 shows a cross-section of the interface between the cab 200 and the sleeper 300. The panel roof 202 of the cab 200, strengthened by the rear header 203, is welded to a panel extension rear header 204 which provides the upper portion of the perimeter 220 of the rear opening 219 of the cab 200. The drip rail assembly 315 is adhered to the panel extension rear header 204 by the bond line 207 as discussed above. The drip rail assembly 315 has a mount 349 welded at its front and on either side (see FIG. 4). Bolts may be inserted horizontally through the mount 349 into corresponding tap holes in the rear pillars of the cab 200. This will provide a direct mechanical connection between the drip rail assembly 315 and the cab 200 and provide support against compressive or tensional forces at this point of high stress.

FIG. 3 shows another cross-section of the interface between the cab 200 and the sleeper 300. The left hand rear piller of the cab 200 contains a panel body side 216 welded to a panel rear quarter liner 217 and to a panel rear quarter closer 218 which provides the left side portion of the perimeter 220 of the rear opening 219 of the cab 200. The left hand front quarter panel 303 is adhered to the panel rear quarter closer 218 by the bond line 207 as discussed above.

FIG. 24 shows how the floor assembly 314 is attached to the cab 200. The cross-member 210 is the lower rear component of the cab 200 where it connects to the sleeper 300. The cross member 210 is spot welded to the air bag mounting plate 211.

The floor assembly 314 is adhered to the cross-member 210 by an adhesive at a bond line 207 between the front extrusion of 342 of the floor assembly 314 and the cross-member 210. A joining plate 213 spans the upper intersection of the cross-member 210 and the floor assembly 314. Bolts 214 pass vertically through the joining plate 213 and either the cross-member 210 and the air bag mounting plate 211 or through the floor assembly 314, a floor spacer 355, and a lip of the cross-member 210 and the air bag mounting plate 211. The bolts 214 and the joining plate 213 provide additional support against either compressive or tensional forces in this high stress area.

FIG. 24 also shows how the floor of the cab 200 may be largely made of a composite assembly panel 212 similar to the floor assembly 314 of the sleeper. The cab floor composite assembly panel 212 is adhered to the framework, such as cross-member 210, of the cab at a bond line 215.

The cab 200 which is designed to be attached to the sleeper 300 may be disconnected from the sleeper 300 by removing any strengthening bolts and then by severing the bond line 207 and any sealant 209 between the cab 200 and the sleeper 300. The sleeper 300 can be replaced with a rear cab panel 206. Alternatively, the cab could be manufactured and sold originally with a rear cab panel 206 in place of the sleeper 300, in which case the rear cab panel 206 could be removed later and the sleeper 300 attached.

Figure 23:
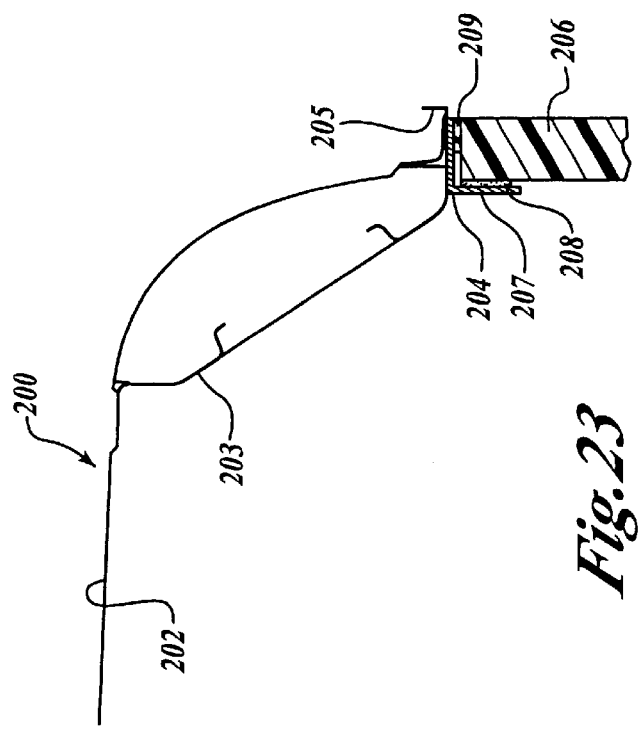
FIG. 23 shows the same cross-section of the cab roof as shown in FIG. 22 except a rear cab panel replaces the sleeper.
Figure 25:
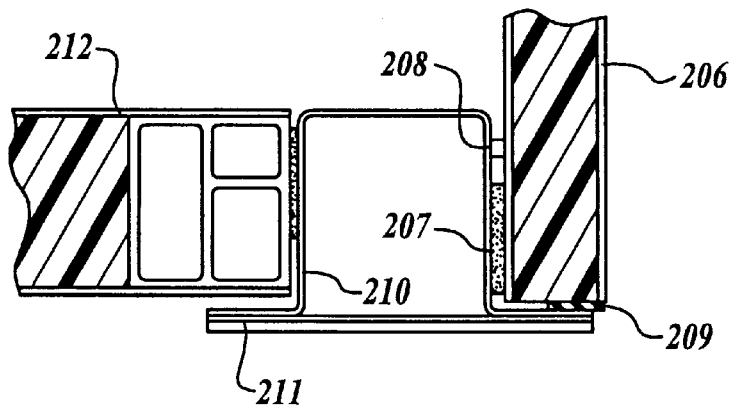
FIG. 25 shows the same cross-section of the cab floor as shown in FIG. 24 except a rear cab panel replaces the sleeper.
Figure 26:
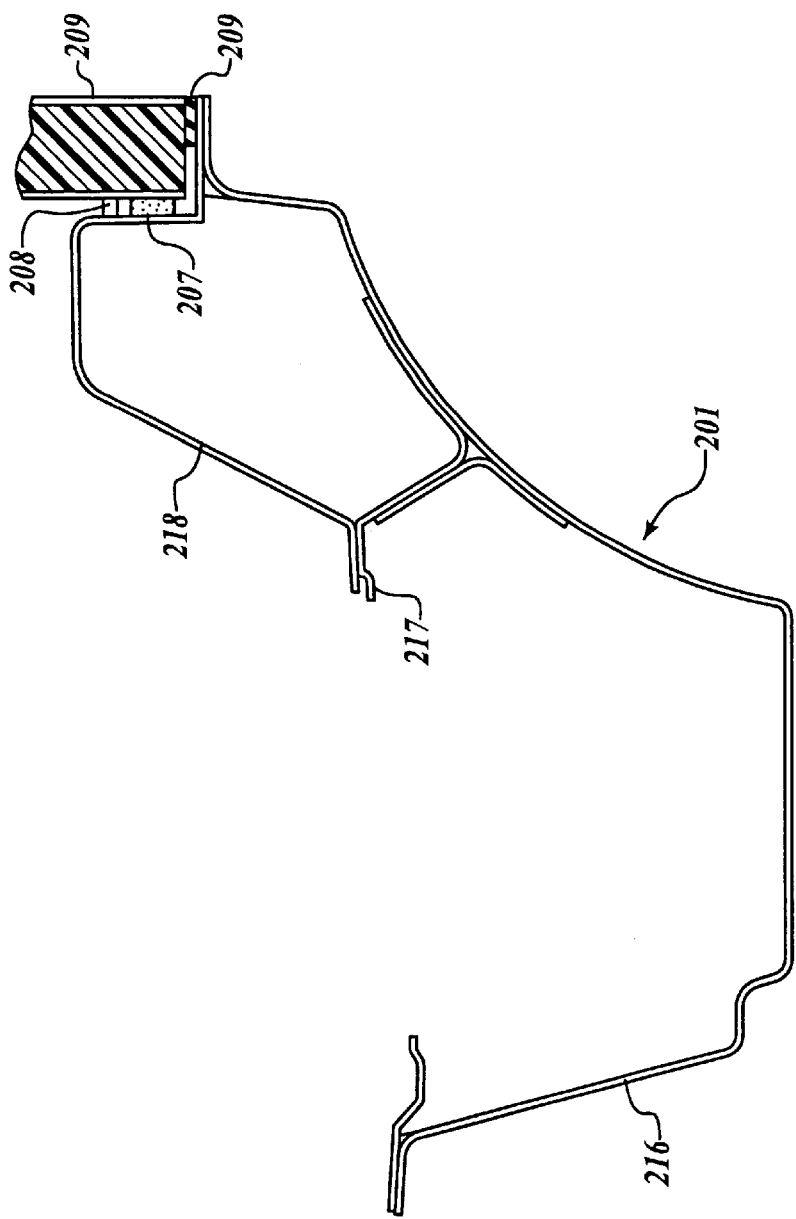
FIG. 26 shows the same cross-section of the left-hand rear pillar of the cab shown in FIG. 3 except a rear cab panel replaces the sleeper.

FIGS. 23, 25 and 26 show how the rear cab panel 206 can be adhered to the cab rear perimeter 220 in order to cover the cab rear opening 219.

The cab rear panel 206 preferably is a panel made of a sandwich assembly as described above in connection with the construction of the back panel 312 of the sleeper 300.

Figure 27:
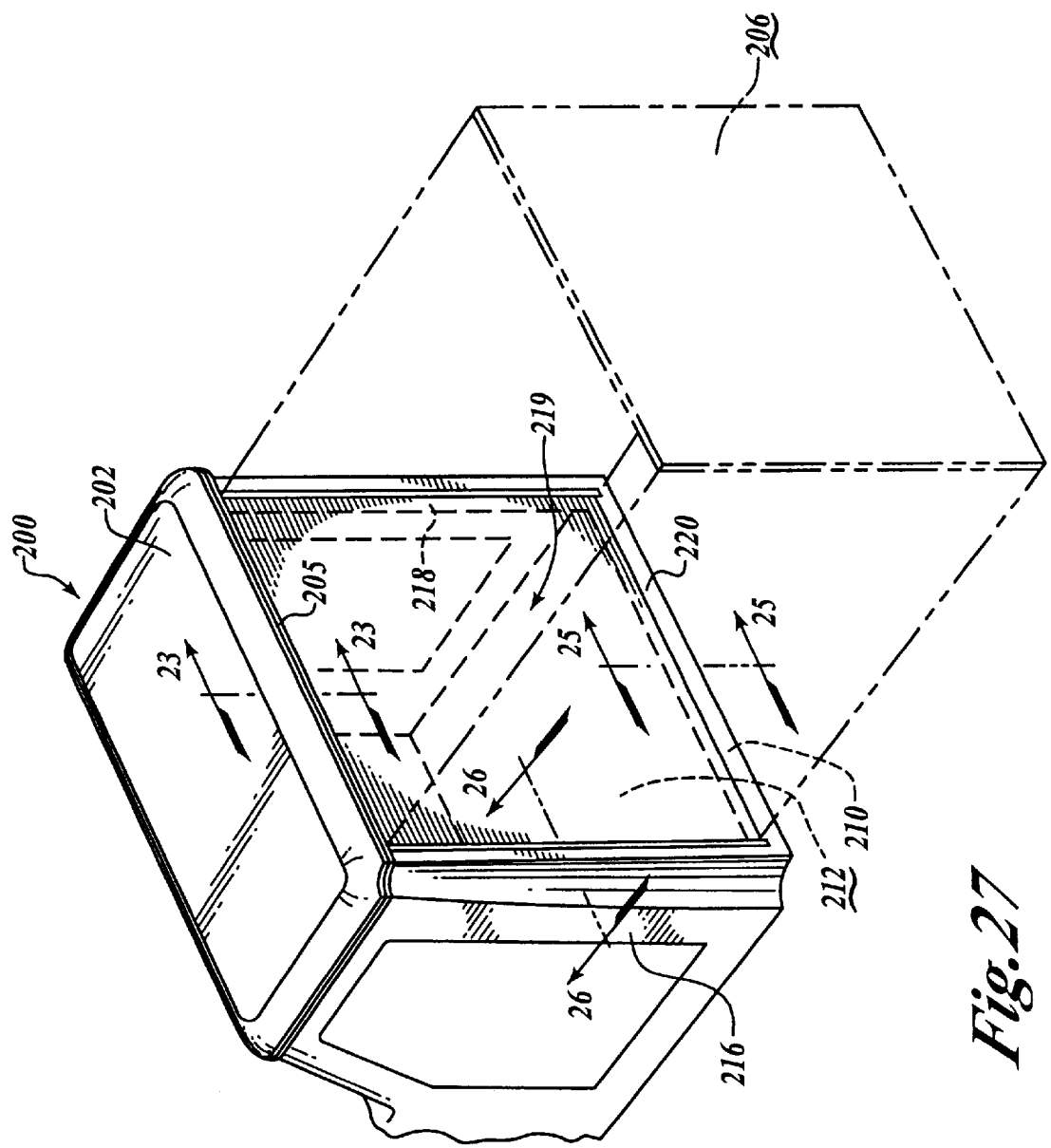
FIG. 27 is a perspective of the cab shown in FIG. 2 except a rear cab panel replaces the sleeper.

FIG. 27 also shows the cab composite floor panel 212 in place. The use of composite assembly panels in the cab 200 will significantly reduce its weight even when it is being used as a day cab as shown in FIG. 27.

Various alterations, modifications, and improvements of the invention will readily occur to those skilled in the art in view of the particular embodiments described above. Such alternations, modifications, and improvements are intended to be part of this disclosure and are intended to be within the spirit and scope of this invention. Accordingly, the foregoing descriptions are by way of example, and are not intended to be limiting. The invention is limited only as defined in the following claims and the equivalents thereof.

What is claimed:

1. A truck cab and sleeper assembly, comprising:
   a cab including a rear opening defining a perimeter;
   a sleeper disposed behind the cab and including a back panel, first and second side panels, a floor assembly and a roof cap, the side panels, floor assembly and roof cap cooperatively defining a forward opening bordered by a perimeter and disposed adjacent the perimeter of the cab, wherein the first and second side panels, back panel and floor assembly each comprise a sandwich composite formed from a honeycomb core sandwiched between first and second structural metal skins, at least some of the assemblies being reinforced by a metal framework;
   a plurality of spacers disposed between the cab perimeter and the sleeper perimeter, defining a gap there between; and
   an adhesive joint that spans the gap between the cab perimeter and the sleeper perimeter and that is adhered in direct contact with each perimeter.

2. The truck cab and sleeper assembly of claim 1, wherein at least one of the side panels and floor assembly comprise a sandwich composite reinforced by an incorporated metal frame work.

3. The truck cab and sleeper assembly of claim 2, wherein each of the first and second side panels and the floor assembly comprise a sandwich composite reinforced by an incorporated metal frame work.

4. The truck cab and sleeper assembly of claim 1, wherein the back panel and first and second side panels cooperatively define an upper edge that is joined to an edge of the roof cap by a metal frame.

5. The truck cab and sleeper assembly of claim 1, wherein the core of each sandwich composite is formed from a material selected from wood, honeycombed metal or honeycombed polymer.

6. A truck cab and sleeper assembly, comprising:
   a cab including a rear opening defining a perimeter;
   a sleeper disposed behind the cab and including a back panel, first and second side panels, a floor assembly and a roof cap, the side panels, floor assembly and roof cap cooperatively defining a forward opening bordered by a perimeter disposed adjacent the perimeter of the cab, wherein at least two of the first and second side panels, back panel and floor assembly comprise a sandwich composite formed from a honeycomb core sandwiched between first and second structural skins, at least some of the assemblies being reinforced by a metal framework;
   a plurality of spacers disposed between the cab perimeter and the sleeper perimeter, defining a gap there between; and
   an adhesive joint that spans the gap between the cab perimeter and the sleeper perimeter and that is adhered in direct contact with each perimeter.

7. A method for assembling a truck cab and sleeper assembly, comprising:
   providing a cab including a rear opening defining a perimeter;
   assembling a sleeper from a back panel, first and second side panels, a floor assembly and a roof cap, wherein at least two of the first and second side panels, back panel and floor assembly comprise a sandwich composite formed from a honeycomb core sandwiched between first and second structural skins, at least some of the assemblies being reinforced by a metal framework, the side panels, floor assembly and roof cap cooperatively defining a forward opening bordered by a perimeter;
   providing a plurality of spacers disposed between the cab perimeter and the sleeper perimeter, defining a gap there between; and
   joining the perimeter of the cab to the perimeter of the sleeper by an adhesive joint that spans the gap between the cab perimeter and the sleeper perimeter and that is adhered in direct contact with each perimeter.

* * * * *